UNITED STATES PATENT OFFICE.

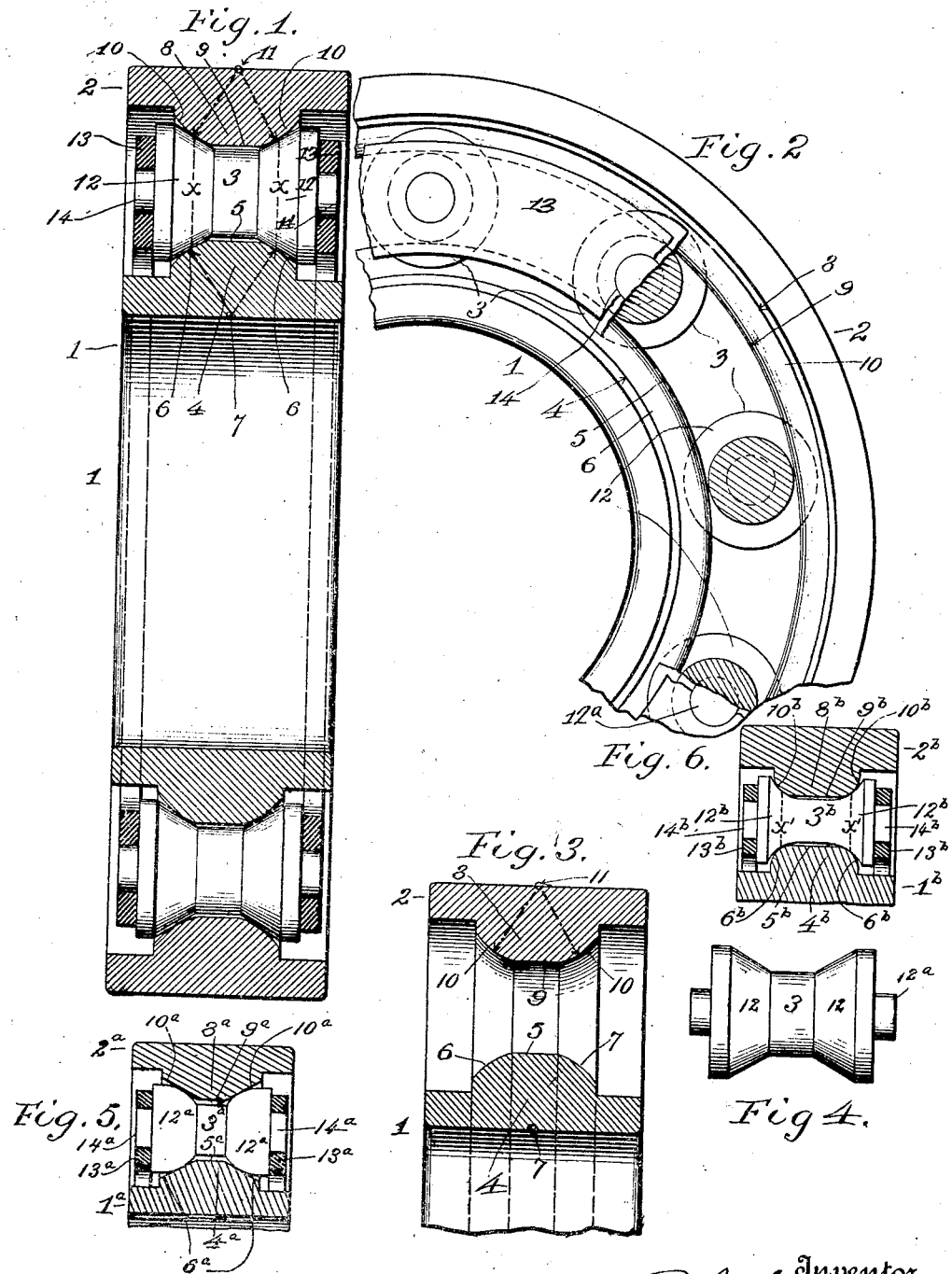

REGINALD JACOB KOSTER, OF PHILADELPHIA, PENNSYLVANIA.

ANTIFRICTION-BEARING.

1,220,345.  Specification of Letters Patent.  Patented Mar. 27, 1917.

Application filed June 4, 1915. Serial No. 32,032.

*To all whom it may concern:*

Be it known that I, REGINALD JACOB KOSTER, a citizen of the United States, residing at Philadelphia, in the county of Philadelphia and State of Pennsylvania, have invented certain new and useful Improvements in Antifriction-Bearings, of which the following is a specification, reference being had therein to the accompanying drawing.

This invention relates to antifriction bearings of the type comprising inner and outer casing members and a series of interposed rolling elements, the object of the invention being to produce a bearing of this type which will take to the best advantage, the radial loads, and also end thrust loads acting in opposite directions, and with the minimum of friction and an absence of sliding or slippage. With these objects in view, my invention consists in the combination with inner and outer casing members provided on their adjacent faces each with two tracking surfaces, of a series of interposed rolling elements, each formed with two circumferentially extending bearing surfaces, sloping from the center of the element outwardly in opposite directions, and adapted to travel respectively on the opposing tracking surfaces of the casing members, the said latter surfaces and those on the rolling elements being of such relative form, that they will engage each other and travel on single lines of contact. As a result of this construction and arrangement, the rolling elements will present at their opposite ends, outwardly sloping abutments opposed at an angle respectively to the tracking surfaces on the casing members, which abutments will receive conjointly the radial loads imposed on the bearing, and will receive also individually and alternately, the thrust loads exerted respectively in opposite directions, the travel of the rolling elements on the tracking surfaces on single lines of contact, insuring a true rolling action in the operation of the bearing, and resulting in a total absence of slippage or sliding, and the minimum of friction between the parts.

My invention is susceptible of embodiment in different forms of construction, a number of which I have represented in the accompanying drawing by way of examples. It will be manifest, however, to those skilled in the art, that the details may be variously changed and modified without departing from the spirit of the invention; and further it will be understood that the invention is not limited to any particular form or construction of the parts, except in so far as such limitations are specified in the claims.

In the accompanying drawings:

Figure 1 is an axial sectional elevation through an antifriction bearing embodying my invention in one form.

Fig. 2 is a side elevation of a portion of the bearing, certain parts being omitted to expose other parts to view, and certain parts being shown in section.

Fig. 3 is a longitudinal section through one side of the concentric casing members, the rolling elements being omitted.

Fig. 4 is an elevation of one of the rolling elements of the form of bearing illustrated in the preceding figures.

Fig. 5 is a longitudinal sectional elevation through one side of a bearing of modified form.

Fig. 6 is a similar view of still another modification.

Referring to the drawings:

Referring particularly to Figs. 1 to 4 inclusive, my improved bearing comprises an inner casing member 1, an outer casing member 2 surrounding the same concentrically, and a series of interposed rolling elements 3. The inner casing member is provided on its external surface with an outwardly extending central rib 4, the central portion of which is cylindrical as at 5, while the side portions are convex axially, thereby producing two circumferentially extending tracking surfaces 6, curved outwardly axially between their ends, the curvature being preferably from a common center 7 located inside the tracking surfaces. The outer casing member 2 is likewise provided on its interior with an inwardly extending rib 8 having its central portion cylindrical as at 9, while its side portions are convex axially, thereby forming two circumferentially extending tracking surfaces 10, the curvature of which are preferably from a common center 11 situated outside of the said tracking surfaces. The rolling elements 3 are each in the form of an elongated roller, provided with straight bearing surfaces 12 which slope outwardly from the center of the roller, thereby forming abutments at the opposite ends of the roller, disposed at opposite angles relatively to the respective tracking surfaces 6 and 10 on the two casing members. The position of the sloping supporting surfaces on the rolling elements relatively to the tracking surfaces on the casing members is such, that, with the rolling elements assembled between the casing members, these surfaces will engage with each other, and owing to the curvature of the tracking surfaces, and the straight form of the engaging supporting surfaces, the rolling elements will travel on the tracking surfaces on single lines of contact, as indicated by the dotted lines X at the upper part of Fig. 1. As a result, the radial loads imposed on the bearing will be received conjointly by the two sloping supporting surfaces of the rolling elements, and the end thrust loads imposed on the bearing, exerted alternately in opposite directions, will be received by the individual supporting surfaces alternately at opposite ends of the rolling elements. The effect of the outwardly sloping supporting surfaces on the rolling elements, is to present abutments at opposite ends of the same, which abutments are disposed at opposite angles respectively to the curved tracking surfaces on the casing members, and in the most favorable position to sustain both the radial loads, and the oppositely acting end thrust loads. The parts are so constructed and relatively disposed, that the lines of travel of the rolling elements on the tracking surfaces are equidistant from a common point between them, the result being that the parts will act with a true rolling effect, will be free from sliding or slippage, and the operation of the bearing will be attended with the minimum of friction and wear.

The rolling elements may be assembled between the casing members in any suitable and appropriate manner; for instance such a limited number of the rolling elements may be employed as will enable them to be assembled between the casing members when the latter are displaced eccentrically, and after the casing members have been restored to their concentric relation, the rolling elements may be distributed throughout the annular space between them, and may be maintained in proper spaced relation by means of spacing rings or cages 13 provided at intervals with bearing openings to receive studs or journals 14 projecting outwardly from the opposite ends of the rolling elements. The casing members are preferably made as integral rings, and with the rolling elements assembled therebetween as shown, they will act to hold the parts of the bearing together after assemblage, thereby forming a unit-handling bearing.

In Fig. 5 I have shown a modified form of my improved bearing. In this case the supporting surfaces 12$^a$ on the rolling elements are curved instead of straight, but slope outwardly in opposite directions from the center of the element, as in the first instance described. The tracking surfaces 6$^a$ and 10$^a$ on the casing members are straight, instead of curved as first described. The surfaces engage each other at single lines of contact, and the operation of the parts, and the consequent advantages enumerated in connection with the construction of the preceding figures, are the same therefore in this modified form.

In Fig. 6 I have represented still another modification. Here it will be seen that both the supporting surfaces 12$^b$ on the rolling elements, and the tracking surfaces 6$^b$ and 10$^b$ on the casing members, are curved, their curvature being from different radii so that they will engage each other, in the operation of the bearing, on single lines of contact as indicated by the dotted lines X' in this figure.

In all of the constructions described, the rolling elements are formed with outwardly sloping supporting surfaces, which supporting surfaces in the construction of Figs. 1 to 4 are straight, while in Fig. 5 they are of convex form, and in Fig. 6 they are of concave form, all however presenting in effect, abutments at the ends of the rollers to receive the radial and end thrusts imposed on the bearing. Also in all of the different forms, the casing members are provided on their adjacent sides with inwardly extending circumferential ribs, forming two tracking surfaces, convex axially as in Figs. 1 to 4 and in Fig. 6, and straight as in Fig. 5. The function and operation of the parts of the several different forms, is however the same in the respect that the rolling elements travel on the tracking surfaces of the casing members on single lines of contact, the single series of rolling elements receiving both the radial loads, and the end thrust loads exerted in opposite directions; and the parts of the bearing operating without slippage or sliding and with the minimum of friction and wear.

Having thus described my invention, what I claim is:

1. An antifriction bearing comprising inner and outer casing members and a series of interposed rolling elements, the outer casing member being provided with two circumferentially extending tracking surfaces on the interior of the same, and the said inner casing member being provided with two circumferentially extending tracking surfaces on the exterior of the same, and disposed respectively opposite tracking surfaces on the outer member, and the said rolling elements being provided each with two supporting surfaces sloping from the center outwardly in opposite directions and adapted to travel respectively on the opposing tracking surfaces of the casing members on single lines of contact.

2. An antifriction bearing comprising inner and outer casing members and a series of interposed rolling elements, the outer casing member being provided with two circumferentially extending tracking surfaces projecting inwardly from the interior of the member, and the said inner casing member being provided with two circumferentially extending tracking surfaces projecting outwardly from the exterior of the member, and disposed respectively opposite the tracking surfaces on the outer member, and the said rolling elements being provided each with two supporting surfaces sloping from the center of the element outwardly in opposite directions and adapted to travel respectively on the opposing tracking surfaces of the casing members on single lines of contact.

3. An antifriction bearing comprising inner and outer casing members and a series of interposed rolling elements, the outer casing member being provided on its interior with two circumferentially extending tracking surfaces convex in cross section, and the said inner casing member being provided on its exterior with two circumferentially extending tracking surfaces convex in cross section and disposed respectively opposite the tracking surfaces of the outer member, and the said rolling elements being provided each with two straight supporting surfaces sloping outwardly from the center in opposite directions and adapted to travel respectively on the opposing tracking surfaces of the casing members on single lines of contact.

4. An antifriction bearing comprising inner and outer casing members and a series of interposed rolling elements, the outer casing member being provided on its interior with two circumferentially extending tracking surfaces projecting inwardly and curved axially from a common center located outwardly of said surfaces, and the said inner casing member being provided with two circumferentially extending tracking surfaces projecting outwardly from the exterior of the member and curved axially from a common center disposed inwardly of said surfaces, and the said rolling elements being provided each with two supporting surfaces sloping from the center outwardly in opposite directions and adapted to travel respectively on the opposing tracking surfaces of the casing members on single lines of contact.

In testimony whereof I have affixed my signature.

REGINALD JACOB KOSTER.